United States Patent [19]

Brodmann et al.

[11] 4,045,601

[45] Aug. 30, 1977

[54] SOLVENT FINISHING OF FIBER GLASS FABRICS

[75] Inventors: George L. Brodmann; Carl Nelson Schlatter, both of Akron, Ohio

[73] Assignee: PPG Industries, Inc., Pittsburgh, Pa.

[21] Appl. No.: 729,223

[22] Filed: Oct. 4, 1976

Related U.S. Application Data

[63] Continuation-in-part of Ser. No. 567,469, April 14, 1975, abandoned.

[51] Int. Cl.² ............................................. B05D 1/38
[52] U.S. Cl. ........................................ 427/381; 8/8
[58] Field of Search ............................. 427/381; 8/8

[56] References Cited

U.S. PATENT DOCUMENTS

| | | | |
|---|---|---|---|
| 3,060,549 | 10/1962 | Hurton | 427/412 |
| 3,387,915 | 6/1968 | Willis | 8/8 |
| 3,545,909 | 12/1970 | Gagliardi | 8/8 |
| 3,591,408 | 7/1971 | Marzocchi | 8/8 |
| 3,649,333 | 3/1972 | Caroselli | 427/314 |
| 3,732,140 | 5/1973 | Bolen | 428/391 |
| 3,779,703 | 12/1973 | Tesoro | 427/390 |

*Primary Examiner*—James R. Hoffman

[57] ABSTRACT

Woven fiber glass fabric is simultaneously resin finished and dyed in a rapid process which impregnates the fabric with a liquid finishing media of low surface tension and high volatility containing dyes and dissolved resins in a halogenated hydrocarbon solvent.

8 Claims, No Drawings

SOLVENT FINISHING OF FIBER GLASS FABRICS

CROSS-REFERENCE TO RELATED APPLICATIONS

This application is a continuation-in-part of application Ser. No. 567,469, filed Apr. 14, 1975, and now abandoned.

BACKGROUND OF THE INVENTION

Fiber glass fabrics have achieved commercial acceptance for decorative uses such as draperies principally because of their outstanding fire resistant properties. However, woven glass fabrics present special problems arising from inherent physical properties such as limited elongation, chemical inertness, and the abrasive force of glass on glass. These properties are observed as problems in areas such as limited intensity and variety of colors, inadequate color fastness and wash fastness, limited abrasion resistance, increased crocking, and an unfavorable "hand".

It is known to apply a resin binder or coating to woven fiber glass fabrics to encapsulate the exposed yarn surfaces. The resin coating provides a yarn with a more resilient finish which reduces abrasion and provides a desirable "hand" to the fabric. The resin coating also constitutes a dye receptive layer which can be used to impart color to the fabric. It is customary to apply the resin binder in the form of an aqueous emulsion or dispersion typically having resin concentrations of 3 to 6 weight percent.

The physical properties of the prior art emulsion and dispersion coating solutions result in a topical treatment to the glass yarn which does not appreciably penetrate the surface of the yarn to wet the component strands or filaments or the points of contact at the crossovers of warp and filling yarns in the treated fiber glass fabric. When the fabric (particularly an open weave fabric) is subjected to mechanical stress, the overlapping yarns shift position and reveal a white spot where no resin or dye has penetrated. An additional disadvantage of aqueous systems is that they require appreciable processing time and expenditure of energy to evaporate contained water. Still another limitation of the aqueous systems is that the variety of commercially available resins which may be dispersed or emulsified in aqueous media is limited.

SUMMARY OF THE INVENTION

This invention is a non-aqueous process for simultaneously resin finishing and dyeing woven fiber glass fabrics by treating the fabric with a liquid pre-finishing composition of low surface tension having glass reactive silicon compound in an organic solvent; volatilizing the solvent; then treating the fabric with a liquid finishing composition of low surface tension containing dye and resin. This invention permits treatment of woven glass fabric with types of resinous materials other than those used in prior art aqueous-based practice. It is a further advantage of the process of this invention that woven fiber glass fabric may be more uniformly dyed. A still further advantage of this invention is that dyes and finishing agents are applied from a media of sufficient volatility to assure speedy removal of solvent and consequently permit higher processing rates than prior art processes.

THE INVENTION

This invention is a non-aqueous multi-step process for the resin finishing and dyeing of fiber glass fabric. In particular this process is a sequential treatment of the fiber glass fabric, first, by impregnation with a liquid pre-finishing composition and then by impregnation with a liquid finishing composition. The liquid pre-finishing composition has as its essential ingredients a glass-reactive organosilicon compound and an organic solvent. The solvent portion of the pre-finishing composition is volatilized from the fabric to provide a surface receptive to subsequent treatment with the liquid finishing composition.

The liquid finishing composition has its essential ingredients a soluble synthetic resin, dye, and chlorinated hydrocarbon solvent. The solvent portion of the finishing composition is volatilized from the fabric to deposit dye and resin with the fabric. The sequence of contacting the fabric with liquid finishing composition and volatilizing the chlorinated hydrocarbon solvent from the fabric may be repeated until a desired quantity of resin and dye is incorporated with the fabric.

DETAILED DESCRIPTION OF THE INVENTION

THE FIBER GLASS FABRIC

The term "fiber glass fabric" refers to a woven fiber glass structure composed of essentially continuous yarns. Fabrics for decorative application are typically made from glass filaments of size designation C, D, or E, combined into strands, which strands are twisted into yarn and the yarn woven into fabric. The weave may be relatively open or closed. Typically, glass fabric weight is in the range of 2 to 8 ounces per square yard (67 to 273 grams per square meter). Glass fabric used in the practice of this invention must have a clean surface susceptible of activation with organosilicon compounds. Coronized glass fabric is a preferred starting material, but it is also possible to use glass fabric surface treated by a combination of techniques, for example, aqueous chemical oxidation to reduce the time and temperature requirements of coronization.

THE DYES

The dyes suitable for the practice of this invention are classified as pigment dyes. These dyes are unreactive with the glass surface and depend on the resin vehicle for their permanent placement with the fabric. A wide variety of pigment dyes are known. Information pertaining to dyes may be obtained from literature sources such as *The Colour Index* (published by American Association of Textile Chemists and Colorists, Greensboro, N.C., 1975, 3rd edition with amendments). Illustrative dyes useful in the practice of this invention are monochloro copper phthalocyanine (C. I. Pigment Blue 15), polychloro copper phthalocyanine of 15 to 16 chlorine atoms (C. I. Pigment Green 7), and lead chromate (C. I. Pigment Yellow 34).

OPTIONAL INGREDIENTS

Among the possible additives to the dye and resin containing finishing composition are materials such as softening agents, dulling agents, antistatic agents, etc. These materials are entirely optional and may be added at the discretion of the user.

THE RESINS

Soluble synthetic resins suitable for the process of this invention include polyacrylics, polyurethanes, polyesters, and polysilicones, with polyacrylics and polyurethanes being particularly preferred. If desired, a mixture of resins may be used. The choice of resin will depend on the selection of properties most desired by the user, for example, flexibility, chemical inertness, resistance to ultraviolet light, or ease of curing. The "soluble synthetic resins" are defined as water insoluble resins which are soluble to the extent of at least 1 percent by weight at 25° C. in a single phase non-aqueous solvent system containing 95 percent by weight of an aliphatic chlorinated hydrocarbon having 1 to 4 carbon atoms and not more than 5 chlorine atoms and a boiling point between 50° and 150° C., STP (25° C and 760 millimeters Hg pressure). Included within the term "soluble synthetic resins" are resins having a low molecular weight (M.W. 200 to 3,000) or uncrosslinked resins. Uncrosslinked resin deposited on the fiber glass fabric may be substantially cured by well-known techniques such as heating, actinic or high energy radiation, chemical agents, etc. Alternately, thermosetting or thermoplastic resins of higher molecular weight (50,000–500,000) may be applied from solvent without the need for additional curing to have utility as suitable fabric finishing agents.

THE LIQUID PRE-FINISHING COMPOSITION

The liquid pre-finishing composition serves to activate the surface of the glass fiber fabric and make it receptive to the finishing treatment required in the remainder of the process.

The liquid non-aqueous pre-finishing composition must have a surface tension of less than 30 dynes/cm. at 25° C. to effectively penetrate the glass fabric. The essential ingredients of the pre-finishing compositions are a glass-reactive low molecular weight organo-silicon compound and an organic solvent. Organic solvents which meet the practical requirements of the process are selected from aliphatic or halogenated aliphatic hydrocarbons having a boiling point between 50° C. and 150° C., STP. Illustrative solvents include heptane; trichloroethylene; perchloroethylene; ethylene dichloride; and 1,1,1-trichloroethane. These solvents may be admixed in any proportion so long as the solvents are miscible and form a single liquid phase.

It is convenient to employ solvents which are removed with minimum effort (viz., conveniently low boiling point and low heat of vaporization) but are not so volatile as to present unnecessarily low temperature of operation requirements or extensive recovery facilities.

The active ingredient of the pre-finishing composition is a glass reactive organosilicon compound. The utility of organosilicon compounds to activate glass surfaces is well-known. In the practice of this invention it is preferred to use 0.1 to 5.0 weight percent of solvent soluble glass-reactive organosilicon compound. The term "solvent soluble" in reference to the organosilicon compounds refers to their required solubility in the aliphatic or halogenated aliphatic hydrocarbon solvent of the pre-finishing solution at the concentrations employed. Typical of organosilicon compounds having utility in the process of this invention are the silanes disclosed in U.S. Pat. No. 2,841,566 (to T. A. TeGrotenhuis, patented July 1, 1958). Illustrative compounds useful in the practice of the invention are allyl dimethyl-silicon chloride, methyl diallylsilicon chloride and tri-methoxy substituted propyl silanes such as gamma-methacryloxypropyltrimethoxysilane.

Another embodiment of the disclosed process is to include pigment dye in the pre-finishing composition.

The dye introduced to the fabric from the pre-finishing composition will normally constitute a minor portion of the total dye combined with the fabric from the operation of the process of this invention. In typical process operation the dye contributed by the pre-finishing solution is less than one-fourth of the total weight of dye combined with the fabric as a result of the operation of the process. Typical dye concentrations in the pre-finishing composition are 0.1 to 2.0 weight percent.

The surface tension of the pre-finishing composition is normally approximately equal to the surface tension of the aliphatic or halogenated aliphatic hydrocarbon solvent, the small proportion of organosilicon compound and dye which is present in the solvent not having a noticeable effect on the surface tension of the composition.

THE LIQUID FINISHING COMPOSITION

The liquid non-aqueous finishing composition serves to simultaneously dye and resin finish the fiber glass fabric. Necessary components of the finishing solution are (1) a "soluble synthetic resin"; (2) pigment dye; and (3) chlorinated hydrocarbon solvent.

The resins and dyes suitable for use in the finishing composition have been previously described. The solvent soluble resin is used at concentrations of 0.5 to 10.0 weight percent. Lower resin concentrations may be used if the lower economy of operation from multiple finishing composition treatments is not an important consideration. It is usually preferred to use between 0.75 and 4.0 weight percent resin. Dye concentration in the finishing composition is typically between 0.1 to 10.0 weight percent.

The solvent for the finishing composition is a single phase non-aqueous liquid system containing at least 90 percent by weight of an aliphatic chlorinated hydrocarbon having 1 to 4 carbon atoms and no more than 5 chlorine atoms and having a boiling point between 50° C. and 150° C., at 760 m.m. Hg. Illustrative of chlorinated solvents useful in formulation of the finishing composition are trichloroethylene, perchloroethylene, ethylene dichloride, 1,1,1-trichloroethane and chloroform. Chlorinated hydrocarbons are excellent solvents and are preferred for solubilizing the wide variety of resins used in the practice of this invention. However, it is sometimes necessary to include a minor portion (up to 10 percent by weight) of a miscible organic co-solvent (e.g., ketones, alcohols and acetates) to aid in the solubilization of a particular resin. Specific co-solvents having utility in combination with chlorinated solvents are methyl alcohol, ethyl acetate, and acetone.

Finishing composition prepared using predominantly aliphatic chlorinated hydrocarbon solvent and the suggested concentration of solvent soluble resin as described above will normally result in a composition having a surface tension of less than 30 dynes/cm. at 25° C. and a viscosity of less than 1,000 centipoises at 25° C.

PROCESS OPERATION

Fiber glass fabric is first treated by impregnation with a liquid pre-finishing composition. The pre-finishing composition may be applied by any conventional technique, for example, by immersion, rollers, pads, apron applicators, sprays or jets. To minimize premature loss of volatile solvent through vaporization, it is preferable to immerse the fabric in a bath of pre-finishing composition and remove the excess solution by passing the treated fabric through the nip of a pair of padder rollers. The pressure of the padder rollers may be adjusted to determine the fabric's pickup of the liquid composition. The quantity of liquid pre-finishing and finishing composition applied to the fabric will typically give a pickup of 30 to 130 percent by weight of the fabric per pass. If desired, the fabric may be dipped and padded one or more times with the solvent being vaporized between each application. A portion of the dye may be introduced together with the pre-finishing solution.

The organosilane compound may, if desired, be further activated or cured after being introduced to the fabric. For example, the heating step used to vaporize the solvent in the pre-finishing solution may concurrently act to cure the silane activator. The pre-treatment step may be repeated if desired.

After the required treatment with pre-finishing solution, the fabric is treated by impregnation with the finishing composition. The finishing composition may be applied by the same variety of methods applicable to the treatment of the fabric with pre-finishing composition. Thereafter, the solvent component of the finishing composition is volatilized. Before, after, or during the removal of solvent, the finishing composition impregnated fabric may be subjected to chemical or physical treatments to crosslink or cure the contained resin. The steps of contacting the fabric with finishing composition and volatilizing the solvent may be repeated for the number of times sufficient to deposit the desired quantity of resin and dye with the fabric. Optionally, the fabric may be treated with a series of finishing solutions any of which may have different resin, dye or solvent components within the guidelines herein taught.

It is generally necessary to deposit between 0.5 and 10.0 percent by weight (typically 1 to 4 percent) of resin and dye (based on the weight of fabric) with the fabric to achieve desirable properties. The dye is generally less than 50 percent of the total weight of dye and resin deposited with the fabric.

SOLVENT RECOVERY

The vapors of solvents removed from the fabric during volatilization of the pre-finishing and finishing solutions (as, for example, by forced air ovens) may be collected in a system employing adsorption or condensation units, for example, cooling coils or a bed or activated carbon. The condensed or adsorbed solvent is then recycled for reformulation into fabric treating composition.

The following Examples are illustrative of the manner in which this invention be practiced:

PROCEDURE USED IN THE EXAMPLES

All pre-finishing and finishing solutions were applied to 14 inch wide No. 10055 fiber glass casement fabric (weight of 4.2 ounces per square yard, product of Burlington Industries, N.Y., N.Y.) with a Gaston County Model LPS-2 three roll 22 inch laboratory padder (manufactured by Gaston County Dyeing Machine Company, Stanley, N.C.), fitted with two stainless steel rolls and one roll coated with fluorinated elastomer.

The padder was operated at 11 pounds (5 kilograms) pressure setting and all samples were passed double-dip double-nip through the rolls. After application, the fiber glass fabric samples were air dried in a forced air oven for about 5 minutes at increasing temperature (82°-163° C.), plus 2 minutes at 163° C. constant temperature.

All proportions are on a weight basis unless otherwise indicated.

All pre-finishing compositions employed have a surface tension of less than 30 dynes/cm. at 25° C. All finishing compositions have a surface tension of less than 30 dynes/cm. at 25° C. and a viscosity of less than 1,000 centipoise at 25° C.

FABRIC EVALUATION TESTS

The following test procedures were employed to evaluate the fabric samples of the following examples:

DETERMINATION OF RESIN ADDED

Resin add-on was calculated from the known concentration of resin in the pad bath and the experimentally determined wet pickup. Wet pickup is obtained by padding the finishing solution onto a weighed fabric sample and placing the sample into a tared jar immediately as it comes out of the final padder nip roll.

ABRASION TEST

Method using — Stoll Flex Test ASTM D-1175-71, flexing and abrasion method.

LIGHTFASTNESS TEST

Method used — AATCC (American Association of Textile Chemists and Colorists, Research Triangle Park, N. C.) 16A-1971; evaluation of the faded fabrics was based on the AATCC Grey Scale for Color Change. Standards are numbered from one (greatest change) to five (no visible difference.).

WASHING AND DRYING TEST

Washing and drying test performed in Kenmore Upright agitator-type washer and tumble-type dryer. Washer setting of —1st line "normal" cycle; "Hi" water level; "WC" on wash and rinse; water temperature of 110° F. (43.3° Celsius), 57° F. (13.9° Celsius). A 4 pound (1.81 kg) total load was used in each test; 15 g Ivory Flakes (sodium salt of long chain fatty acids) was used as the detergent.

Samples were dried for 30 minutes. The washing and drying procedure was repeated three consecutive times for each fabric sample. At the conclusion of the washing and drying tests, the samples were rated by shade, evenness of color and physical damage on a scale of 1 to 5 with "1" being the worst and "5" being the best appearance.

EXAMPLE I

This example illustrates the finishing of fiber glass casement fabric with an acrylic type resin. Finishing was done with a two bath system. The first bath was a silane treatment for the fabric. The second bath constitutes the resin finishing agents.

|  | Amount | % Solids OWB |
|---|---|---|
| First Bath | 3.3 g. Union Carbide A-174 Silane[1] <br> to 1631 g. total weight, by dilution | 0.2% <br> — |

|  | Amount |  | % Solids OWB |
|---|---|---|---|
| Second Bath | 326 g. | with trichloroethylene Acryloid K7003[2] | 4 % |
|  | 65.5 g. | Urea-formaldehyde dulling agent, 25% w/w in Trichloroethylene | 0.5% |
|  | 32.5 g. | Emery 108B[3] | 1 % |
|  | 163 g. | Aridye Blue 3G[4] | 5 % |
|  | to 3265 g. | total weight, by dilution with Trichloroethylene |  |

[1]Gamma-methacryloxypropyltrimethoxysilane, product of Union Carbide Chemical and Plastics Division of Union Carbide Corp., 270 Park Ave., N. Y. 10017.
[2]An acrylic polymer which is derived from 93-96 percent ethyl acrylate, 4-7 percent glycidyl methacrylate, Rohm & Haas, Philadelphia, Pa.
[3]Nonionic hydroxy-terminated ester, soluble in chlorinated solvents. Experimental product of Emery Industries, Cincinnati, Ohio
[4]Monochloro copper phthalocyanine pigment dye. Inmont Corp., Clifton, N. J.

Coronized fiber glass fabric was sewn together to make a roll 14 inches wide and about 10 yards long. This roll was arranged double-dip double-nip through the treatment baths and a drying oven.
Results are shown in Table 1.

EXAMPLE II

This example illustrates the finishing of fiber glass fabric with a urethane type resin. The procedure of Example I was used excepting the following resin treating baths were applied.

|  | Amount |  | % Solids OWB |
|---|---|---|---|
| First Bath | 5.8 g. | Dow Corning Z-6040 silane[1] | 0.2% |
|  | to 2900 g. | trichloroethylene |  |
| Second Bath | 1740 g. | Interlayer Resin-112(30)[2] 5% w/w in chloroform | 4 % |
|  | 43.6 g. | Urea-formaldehyde dulling agent, 25% w/v trichloroethylene | 0.5% |
|  | 21.8 g. | Emery 108-B | 1.0% |
|  | 108.8 g. | Aridye Blue 3G | 5 % |
|  | to 2177 g. | Total weight by dilution with trichloroethylene |  |

[1]Gamma-glycidoxypropyltrimethoxysilane

[2]Copolymer of Hylene W: OCN—⬡—CH$_2$—⬡—NCO, and a polyester, based on adipic acid and 1,4-butanediol. Product of PPG Industries, Inc., Pittsburgh, Pa.

Results are shown in Table 1.

EXAMPLE III

This example illustrates the finishing of fiber glass fabric with a polyester resin. The procedure is that used in Example I.

|  | Amount |  | % Solids OWB |
|---|---|---|---|
| First Bath | 4.8 g. | Union Carbide A-174 silane | 0.2% |
|  | to 1195.2 g. | trichloroethylene |  |
| Second Bath | 52.2 g. | Polyester resin[1] | 6 % |
|  | 87 ml. | Cationic Softener 10% w/v in trichloroethylene | 1 % |
|  | 17.4 g. | Urea-formaldehyde dulling agent | 0.5% |
|  | 43.5 g. | Aridye Blue 3G | 5 % |
|  | to 870 g. | Total weight by dilution with trichloroethylene |  |

[1]Terpolymer of ethylene glycol, terephthalic acid and linoleic dimer acid (Emery Industries, 4900 Este Ave., Cincinnati, Ohio, 45232).

Results are shown in Table 1.

EXAMPLE IV

This example illustrates the use of silicone resins in finishing fiber glass fabrics. The method of Example I was used.

|  | Amount |  | % Solids OWB |
|---|---|---|---|
| First Bath | 4.8 g. | Union Carbide A-174 silane | 0.4% |
|  | to 1195.2 g. | trichloroethylene |  |
| Second Bath | 52.2 g. | XF-3597 Fluid[1] | 6 % |
|  | 5.2 g. | X2-7043 Catalyst[2] | 0.6% |
|  | 87 ml. | Cationic Softener 10% w/v in trichloroethylene | 1 % |
|  | 17.4 g. | Urea-formaldehyde dulling agent | 0.5% |
|  | 43.5 g. | Aridye Blue 3G | 5 % |
|  | to 870 g. | Total weight by dilution with trichloroethylene |  |

[1,2]Products of Dow Corning Corp., Midland, Michigan
A two-part silicone system which air cures or heat cures to a hard transparent coating.

Results are shown in Table 1.

It is to be understood that although the invention has been described with reference to specific details of certain embodiments thereof, it is not intended to be limited to such details except insofar as they appear in the appended claims.

TABLE 1

Performance Data for Examples on Fiber Glass Fabric

| Example Number | Resin Type | Resin Add-On | Aesthetics (Softness) | Stoll Flex Warp | Stoll Flex Filling | Lightfastness 200 Hr. | Wash Rating 3 Washes |
|---|---|---|---|---|---|---|---|
| 1 | Acrylic | 2% | Very good | 28 | 26 | 5.0 | 4 |
| 2 | Urethane | 2% | Slightly stiff | 27 | 34 | 5.0 | 3.5 |
| 3 | Polyester | 3% | Very good | 32 | 30 | 5.0 | 3 |
| 4 | Silicone | 3% | Very soft | 15 | 20 | 5.0 | 3 |

We claim:

1. A non-aqueous process for resin finishing and dyeing woven fiber glass fabric which comprises the steps of sequentially:
   A. impregnating the fabric with a liquid pre-finishing composition having a surface tension of less than 30 dynes/cm. at 25° C.; which composition comprises (1) 0.1 to 5.0 weight percent of solvent soluble glass-reactive low molecular weight organosilicon compound and (2) organic solvent having a boiling point of 50° C. to 150° C. at 760 mm Hg pressure;
   B. volatilizing a major portion of the organic solvent from the fabric;
   C. impregnating the fabric with a liquid finishing composition having a surface tension of less than 30 dynes/cm. at 25° C.; and a viscosity of less than 1,000 centipoises at 25° C.; which composition comprises (1) 0.5 to 10.0 weight percent of solvent soluble synthetic resin selected from the group consisting of polyacrylics, polyurethanes, polyesters, and polysilicones; (2) pigment dye; and (3) single phase solvent comprising at least 90 percent by weight of aliphatic chlorinated hydrocarbon having 1 to 4 carbon atoms and no more than 5 chlorine atoms, said solvent having a boiling point between 50° C. to 150° C. at 760 mm Hg pressure; then
   D. volatilizing a major portion of the aliphatic chlorinated solvent from the fabric thereby depositing resin and dye on the fabric.

2. The process of claim 1 wherein the liquid pre-finishing composition contains a pigment dye.

3. The process of claim 1 wherein step D includes curing the deposited resin.

4. The process of claim 1 wherein 1 to 10 weight percent of synthetic resin is deposited with the fabric.

5. The process of claim 1 wherein the solvent of steps A and C is selected from one or more members of the group consisting of ethylene dichloride; perchloroethylene; trichloroethylene; and 1,1,1-trichloroethane.

6. The process of claim 1 wherein the resin of step C is a polyacrylic resin.

7. The process of claim 1 wherein the resin of step C is a polyurethane resin.

8. The process of claim 1 wherein the liquid composition of step C contains no more than 4 weight percent of soluble synthetic resin.

* * * * *